US008826941B2

(12) United States Patent  
Saito et al.

(10) Patent No.: US 8,826,941 B2  
(45) Date of Patent: Sep. 9, 2014

(54) PORT CLOSING DEVICE FOR COMPRESSOR

(71) Applicant: Kabushiki Kaisha Toyota Jidoshokki, Aichi-ken (JP)

(72) Inventors: Hiroshi Saito, Aichi-ken (JP); Mamoru Kuwahara, Aichi-ken (JP); Mitsunori Yoshida, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 113 days.

(21) Appl. No.: 13/626,307

(22) Filed: Sep. 25, 2012

(65) Prior Publication Data

US 2013/0075405 A1 Mar. 28, 2013

(30) Foreign Application Priority Data

Sep. 27, 2011 (JP) .................... 2011-210824  
Jun. 1, 2012 (JP) .................... 2012-125546

(51) Int. Cl.
| | | |
|---|---|---|
| *F16L 55/11* | (2006.01) | |
| *F16J 13/14* | (2006.01) | |
| *F04B 39/12* | (2006.01) | |
| *F04B 27/10* | (2006.01) | |
| *F16J 15/06* | (2006.01) | |

(52) U.S. Cl.  
CPC .............. *F04B 39/123* (2013.01); *F16J 13/14* (2013.01); *F04B 27/1036* (2013.01); *F16J 15/062* (2013.01)  
USPC .............................. 138/89; 138/96 R; 138/92

(58) Field of Classification Search  
CPC .......... F16J 15/062; F16J 13/14; B65D 59/02  
USPC ............. 138/89, 92, 96 R; 137/800; 220/327, 220/328, 254.8, 254.1, 259.3, 256.1; 215/247, 320; 600/573, 574  
See application file for complete search history.

(56) References Cited

U.S. PATENT DOCUMENTS

| | | | | |
|---|---|---|---|---|
| 3,777,926 | A | * | 12/1973 | Stieler et al. ................ 220/849 |
| 5,232,111 | A | * | 8/1993 | Burns ........................ 215/320 |
| 5,361,921 | A | * | 11/1994 | Burns ........................ 215/320 |
| 5,425,466 | A | * | 6/1995 | Bambacigno ............ 220/203.09 |
| 5,988,223 | A | * | 11/1999 | Kanzaki et al. ................ 138/89 |
| 6,053,350 | A | * | 4/2000 | Suitou et al. ................ 220/327 |
| 6,602,206 | B1 | * | 8/2003 | Niermann et al. ............ 600/573 |
| 7,275,682 | B2 | * | 10/2007 | Excoffier et al. ............. 235/375 |

(Continued)

FOREIGN PATENT DOCUMENTS

| | | |
|---|---|---|
| JP | U58-76862 | 5/1983 |
| JP | 11-082858 | 3/1999 |

*Primary Examiner* — Patrick F Brinson  
(74) *Attorney, Agent, or Firm* — Greenblum & Bernstein, P.L.C.

(57) ABSTRACT

There is provided a port closing device for a compressor which is fixed to a housing of the compressor by a bolt and includes a packing and a cap. The packing closes a suction port or a discharge port formed in the housing. The packing has a first end, a second end and a peripheral surface formed between the first end and the second end. The first end of the packing has a flat seal portion that is in contact with a surface of the housing surrounding the port. The cap has a holding portion that presses the peripheral surface of the packing for holding the packing, and a pressing portion that presses the second end of the packing. The pressing portion of the cap has therethrough a hole.

4 Claims, 6 Drawing Sheets

(56) References Cited

U.S. PATENT DOCUMENTS

| | | | |
|---|---|---|---|
| 8,602,064 B2* | 12/2013 | Yoneda et al. | 138/89 |
| 8,627,970 B2* | 1/2014 | Macy et al. | 215/296 |
| 2001/0020607 A1* | 9/2001 | Chiarin | 215/247 |
| 2012/0211102 A1* | 8/2012 | Yoneda et al. | 137/565.11 |
| 2013/0075405 A1* | 3/2013 | Saito et al. | 220/328 |

* cited by examiner

PORT CLOSING DEVICE FOR COMPRESSOR

BACKGROUND OF THE INVENTION

The present invention relates to a port closing device for a compressor, and more particularly to a port closing device including a packing that closes a suction port or a discharge port of a compressor and a cap that holds the packing.

After a compressor of a car air-conditioner has been made in a factory, lubricating oil is charged in the compressor. The housing of the compressor has a suction port and a discharge port that are connected with external pipes. After the lubricating oil has been charged in the compressor, the suction port and the discharge port are closed by rubber seal caps that are press-fitted in the ports and serve as port closing devices. Gas tightness test is conducted by using test gas filled in the compressor with the suction and discharge ports closed by the seal caps. After the gas tightness test, the compressor sealed by the seal caps is shipped to a car-assembly plant, where the compressor is mounted on a car with the suction port and the discharge port kept closed by the seal caps.

In a gas tightness test, firstly a gas injection needle is pierced through each seal cap into the compressor for injecting a test gas into the compressor. The compressor thus injected with test gas is then placed in a vacuum vessel for inspection for any gas leakage from the compressor. The seal caps may be considered to have sufficient gas tightness if no gas leakage is recognized. The seal caps may be considered to fail to have sufficient gas tightness if any gas leakage is recognized.

Japanese Unexamined Patent Application Publication No. 11-82858 discloses a passage closing device for a compressor. This passage closing device includes a resin mounting member and a closing member that closes the suction port in the housing of the compressor. The closing member has a cover portion that closes the suction port and a stop portion that stops the closing member from dropping off from the mounting member. The mounting member has at one end thereof a recess through which a stud bolt mounted to the housing may be inserted and at the other end thereof a hole whose diameter is smaller than that of the stop portion of the closing member. The closing member is mounted to the mounting member by press-fitting the closing member into the mounting member in such a way that the stop portion extends out of the hole.

The mounting member thus mounted with the closing member is fixed to the housing. In fixing the mounting member to the housing, the cover portion is press-fitted into the suction port and the mounting member is fixed to the housing by the stud bolt inserted in the recess and tightened by a nut.

Japanese Utility Model Application Publication No. 58-76862 discloses a plug for temporarily closing input/output port as used in a fluid-pressure control device. The plug is made of a synthetic resin having elasticity. The plug includes an annular projecting surface that is in close contact with the surface surrounding the opening of the input/output port and a cylindrical insertion portion that engages with the inner surface of the input/output port. A plurality of axial slits is formed in the insertion portion of the plug. The plug, whose annular projecting surface closes the input/output port, is removable easily because of the slits formed in the insertion portion.

Although the Publication No. 11-82858 disclosing a passage closing device for a compressor mentions nothing about the gas tightness test of the compressor, a needle may be pierced through the closing member made of an elastic member for injecting gas into the compressor. After the needle is pulled out from the closing member, the needle mark left in the closing member is closed by the elastic force of the cover portion that is strengthened by press-fitting the cover portion into the suction port. Thus, the compressor mounted with the passage closing device may be placed in a vacuum vessel for inspection for any gas leakage from the compressor. However, the passage closing device disclosed in the Publication No. 11-82858 is configured so as to seal between an external pipe of the compressor and the inner peripheral surface of the port of the compressor. An O-ring that is commonly used as a sealing member cannot provide sufficient sealing against refrigerant leakage of today's car air-conditioner. A sealing member having a larger seal area than the O-ring is demanded.

The plug disclosed in the Publication No. 58-76862 is designed for sealing between the surface surrounding the port and an external pipe of the compressor. If a gasket is used with the plug, a larger seal area may be provided. In the plug whose projecting surface is not press-fitted into the port, however, needle mark formed by piercing a needle through the plug for gas injection may not be completely closed. Therefore, when the compressor mounted with the plug is placed in a vacuum vessel for inspection for any gas leakage from the compressor, the compressor is highly prone to gas leakage through the needle mark, which makes it impractical to perform the gas tightness test of a compressor.

The present invention is directed to a port closing device for a compressor that seals between a surface of the housing surrounding the port and an external pipe appropriately for performing a gas tightness test of the compressor.

SUMMARY OF THE INVENTION

In accordance with an aspect of the present invention, there is provided a port closing device for a compressor which is fixed to a housing of the compressor by a bolt and includes a packing and a cap. The packing closes a suction port or a discharge port formed in the housing. The packing has a first end, a second end and a peripheral surface formed between the first end and the second end. The first end of the packing has a flat seal portion that is in contact with a surface of the housing surrounding the port. The cap has a holding portion that presses the peripheral surface of the packing for holding the packing, and a pressing portion that presses the second end of the packing. The pressing portion of the cap has therethrough a hole.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
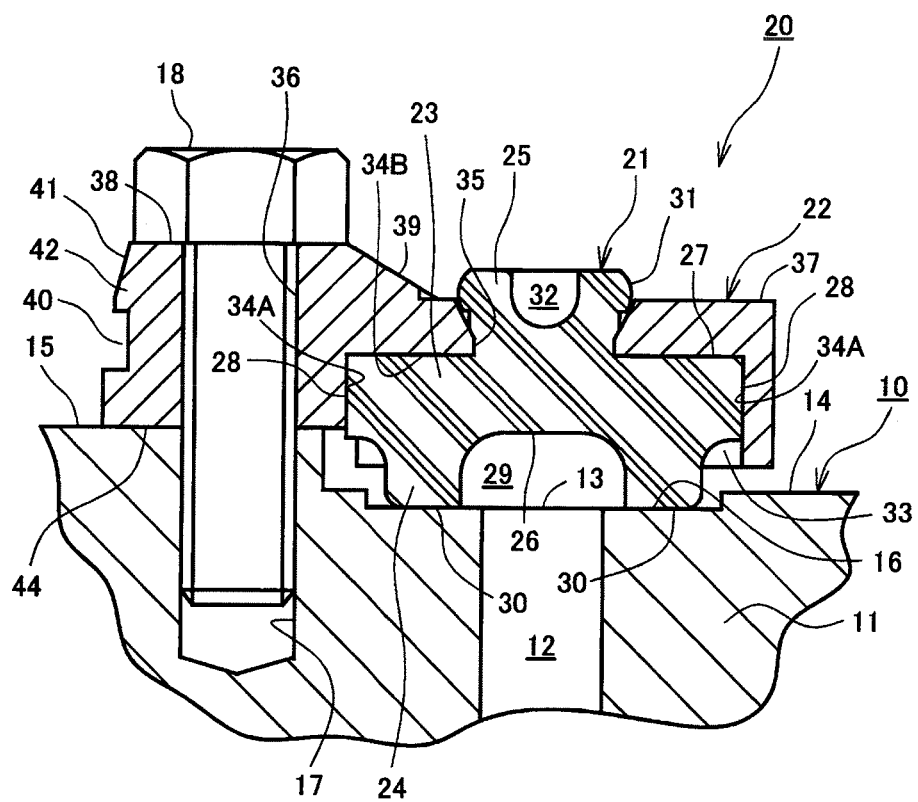
FIG. 1 is a vertical sectional view showing a port closing device for a compressor according to a first embodiment of the present invention.

The following will describe the port closing device for a compressor according to the first embodiment of the present invention with reference to the drawings. The port closing device of the present embodiment is provided by a seal cap for a compressor of a car air-conditioner. Referring to FIG. 1 showing the port closing device in a vertical sectional view, the compressor is designated by reference numeral 10. The housing 11 of the compressor 10 has a refrigerant gas passage 12 through which refrigerant gas passes. The housing 11 has a first surface 14 and a second surface 15 whose level is higher than that of the first surface 14, as shown in FIG. 1.

The refrigerant gas passage 12 is opened at the first surface 14 as a suction port 13 of the compressor 10 and circular in cross section. The first surface 14 also has an annular flat surface 16 that recedes from the surface 14 and surrounds the port 13. The annular flat surface 16 is in contact with a seal cap 20 and serves as the surface of the housing surrounding the port of the present invention. The second surface 15 of the housing 11 has a threaded hole 17 in which a bolt 18 is screwed for fixing the seal cap 20 to the housing 11. The threaded hole 17 may be used for fixing a refrigerant pipe (not shown) to the housing 11 after a gas tightness test of the compressor 10 is finished and the seal cap 20 is removed from the housing 11.

The seal cap 20 includes a packing 21 and a cap 22 to which the packing 21 is mounted. The packing 21 is made of a rubber that is elastically deformable by application of external force. The packing 21 has a substantially cylindrical main body 23, an annular first projection 24 extending downward from the lower surface 26 of the main body 23, and a second projection 25 extending upward from the upper surface 27 of the main body 23. The second projection 25 serves as the projection of the present invention. The main body 23 of the packing 21 has a circumferential surface 28 formed between the lower surface 26 and the upper surface 27. In the present embodiment, the distal end of the first projection 24 serves as the first end of the packing of the present invention, and the upper surface 27 of the main body 23 serves as the second end of the packing of the present invention. In addition, the circumferential surface 28 serves as the peripheral surface of the present invention. That is, the peripheral surface is formed between the first end and the second end. The packing 21 is held at the circumferential surface 28 thereof by the cap 22.

The packing 21 has in the bottom thereof a first recess 29 surrounded by the first projection 24. The distal end of the first projection 24 forms a flat seal portion 30. With the seal cap 20 fixed on the compressor 10, the flat seal portion 30 placed in contact with the annular flat surface 16 of the housing 11 closes the port 13. Thus, the packing 21 having the flat seal portion 30 set in contact with the annular flat surface 16 and surrounding the port 13 closes the port 13 fluid-tightly without being inserted in the refrigerant gas passage 12.

The second projection 25, which extends from the upper surface 27 of the main body 23, has a diameter that is smaller than that of the main body 23. The second projection 25 has at a position adjacent to the distal end thereof the maximum-diameter portion 31 whose diameter is the greatest in the second projection 25. The diameter of the second projection 25 decreases from the maximum-diameter portion 31 downward or toward the main body 23. The second projection 25 has at the distal end face thereof a second recess 32 whose inside diameter is smaller than that of the port 13. The provision of the first recess 29 and the second recess 32 reduces the thickness of the packing 21 in vertical direction.

Figure 2:
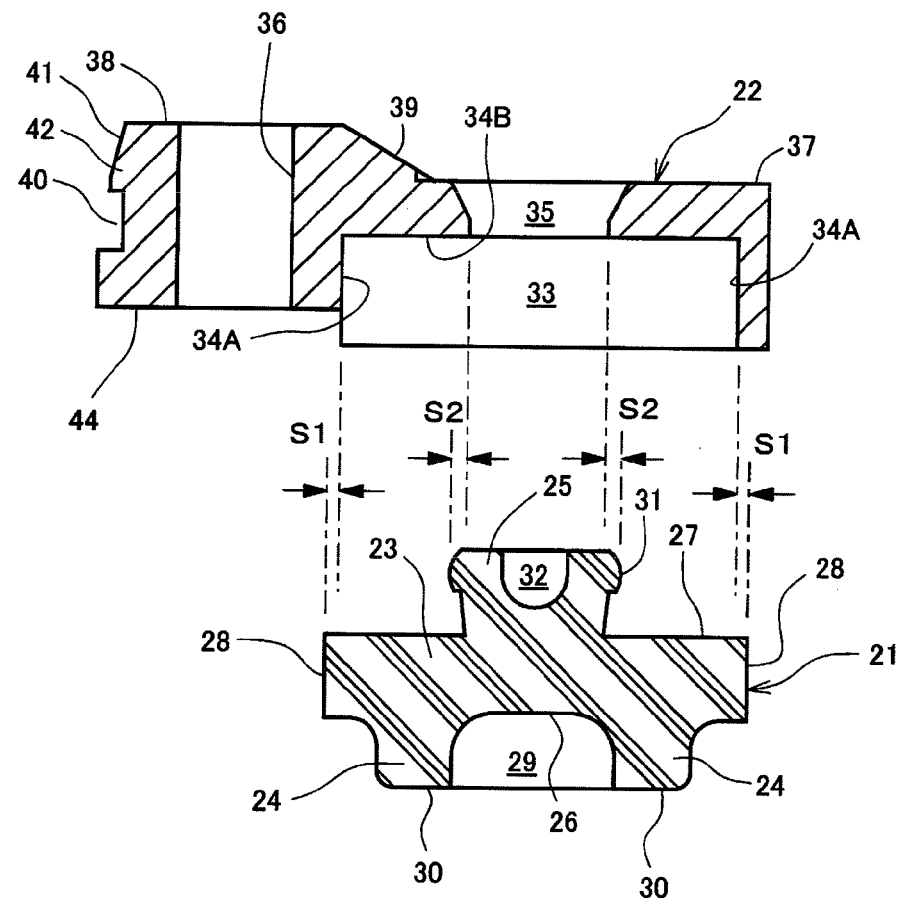
FIG. 2 is an exploded vertical sectional view showing the port closing device of FIG. 1.

The following will describe the cap 22 in detail. The cap 22 is made of a resin. The cap 22 has a holding portion 34A and a pressing portion 34B that cooperate to form a recess 33 in which the packing 21 is received, as shown in FIG. 2. The inside diameter of the holding portion 34A is set smaller than the outside diameter of the cylindrical main body 23 of the packing 21. The packing 21, which is made of an elastically deformable rubber, allows the main body 23 of the packing 21 to be fitted in the recess 33. Thus, the holding portion 34A needs to have such an inside diameter that allows the main body 23 of the packing 21 to be fitted in the recess 33. In the present embodiment, dimensional difference S1 is set between the inside diameter of the holding portion 34A and the outside diameter of the main body 23 as shown in FIG. 2. The holding portion 34A of the cap 22 presses against the circumferential surface 28 of the packing 21 fitted in the recess 33 for holding the packing 21. The pressing portion 34B is in contact with the upper surface 27 of the main body 23 of the packing 21 fitted in the recess 33.

The pressing portion 34B of the cap 22 has therethrough a hole 35. The hole 35 is formed to receive the second projection 25 of the packing 21 with the top of the packing 21 exposed outside. The diameter of the hole 35 is set smaller than the maximum diameter of the second projection 25. The second projection 25 of the packing 21 that is made of an elastic rubber is insertable through the hole 35. Thus, the hole 35 needs to have such a diameter that the maximum-diameter portion 31 of the second projection 25 is inserted through the hole 35. In the present embodiment, dimensional difference S2 is set between the diameter of the hole 35 and the maximum diameter of the second projection 25, as shown in FIG. 2. With the second projection 25 of the packing 21 inserted through the hole 35, the packing 21 is engaged at the second projection 25 thereof with the pressing portion 34B of the cap 22, so that the packing 21 is prevented from being removed from the cap 22 and also that the mounting of the packing 21 to the cap 22 may be visually confirmed.

The cap 22 has an insertion hole 36 at a position that is spaced away from the recess 33 and the hole 35. The insertion hole 36 is formed to receive the bolt 18. The bolt 18 is screwed into the threaded hole 17 of the housing 11. With the seal cap 20 fixed on the compressor 10, the bolt 18 screwed into the threaded hole 17 allows the cap 22 to be in contact with the second surface 15 of the housing 11 and the packing 21 to be in contact with the annular flat surface 16. The region of contact between the cap 22 and the second surface 15 of the housing 11 corresponds to the region of contact to which a flanged end of the refrigerant pipe is fixed after the seal cap 20 is removed.

Figure 3:
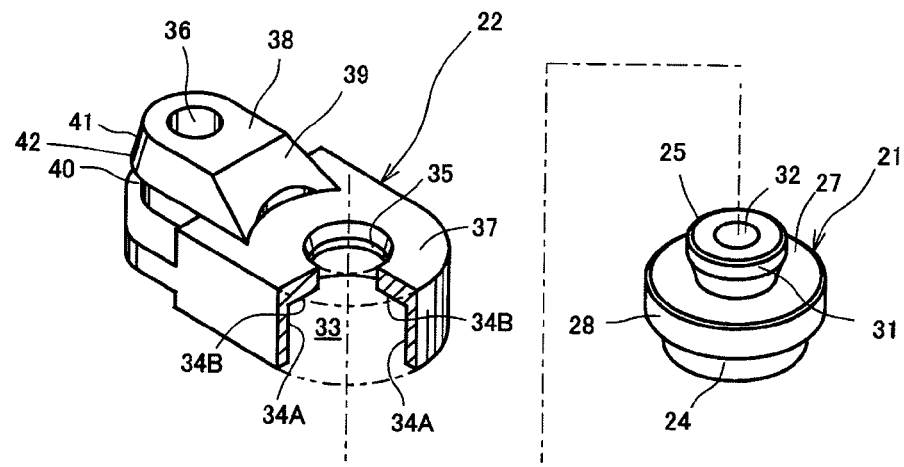
FIG. 3 is an exploded perspective view showing the port closing device of FIG. 1.

With the seal cap 20 fixed on the compressor 10, the upper surface of the cap 22 serves a cap surface. As shown in FIG. 3, the cap surface has a first cap surface 37, a second cap surface 38 and a third cap surface 39. The first cap surface 37 has the hole 35. The second cap surface 38 has the insertion hole 36. The third cap surface 39 interconnects the first cap surface 37 and the second cap surface 38. The level of the first cap surface 37 is lower than that of the second cap surface 38, as shown in FIG. 3. With respect to the back surface 44 of the cap 22, the first cap surface 37 is set lower than the second cap surface 38. With respect to the back surface 44 of the cap 22, the distal end of the second projection 25 is also set lower than the second cap surface 38. Thus, the distal end of the second projection 25 is not higher than the second cap surface 38 as shown in FIG. 1. That is, with the seal cap 20 fixed on the housing 11 by the bolt 18, the second cap surface 38 is the farthest from the upper surface of the housing 11, as shown in FIG. 1.

As shown in FIG. 3, the cap 22 has on the side surface thereof adjacent to the insertion hole 36 a grip portion 42 that is formed by a recess 40 and a tapered portion 41. The grip portion 42 may be held by hand in removing the seal cap 20 from the compressor 10, thus helping to facilitate the removal of the seal cap 20. The seal cap 20 may be removed easily from the housing 11 by holding by hand the grip portion 42. The above-described cap 22 has a high level of strength for its small amount of material.

After being made separately, the packing 21 and the cap 22 are combined together by fitting the packing 21 in the recess 33 of the cap 22 and inserting the second projection 25 through the hole 35.

After the compressor 10 has been made, the seal cap 20 is fixed on the housing 11 of the compressor 10 by the bolt 18. In fixing the seal cap 20 on the housing 11, the seal cap 20 is set with the insertion hole 36 of the cap 22 aligned with the threaded hole 17 of the housing 11 and the flat seal portion 30 of the packing 21 placed into contact with the annular flat surface 16 so as to close the port 13 of the refrigerant gas passage 12 of the compressor 10. The bolt 18 is then passed through the insertion hole 36 and screwed into the threaded hole 17 until the head of the bolt 18 comes in contact with the second cap surface 38. Fastening the bolt 18 causes the pressing portion 34B to be pressed against the packing 21 thereby to press the flat seal portion 30 of the first projection 24 to be pressed against the housing 11 for closing the port 13 fluid-tightly.

In fitting the packing 21 into the recess 33, the main body 23 of the packing 21 having a larger outside diameter than the inside diameter of the recess 33 is compressed radially inward by elastic deformation so that the circumferential surface 28 of the main body 23 of the packing 21 and the holding portion 34A of the cap 22 are pressed against each other. Thus, the packing 21 is held firmly by the cap 22. The second projection 25 inserted through the hole 35 is engaged with the pressing portion 34B of the cap 22, which prevents the removal of the packing 21 from the cap 22. A seal cap of the same structure as the seal cap 20 is used for the discharge port (not shown) of the refrigerant gas passage 12 of the same compressor for closing the discharge port. Thus, the discharge port is sealed fluid-tightly.

Figure 4:
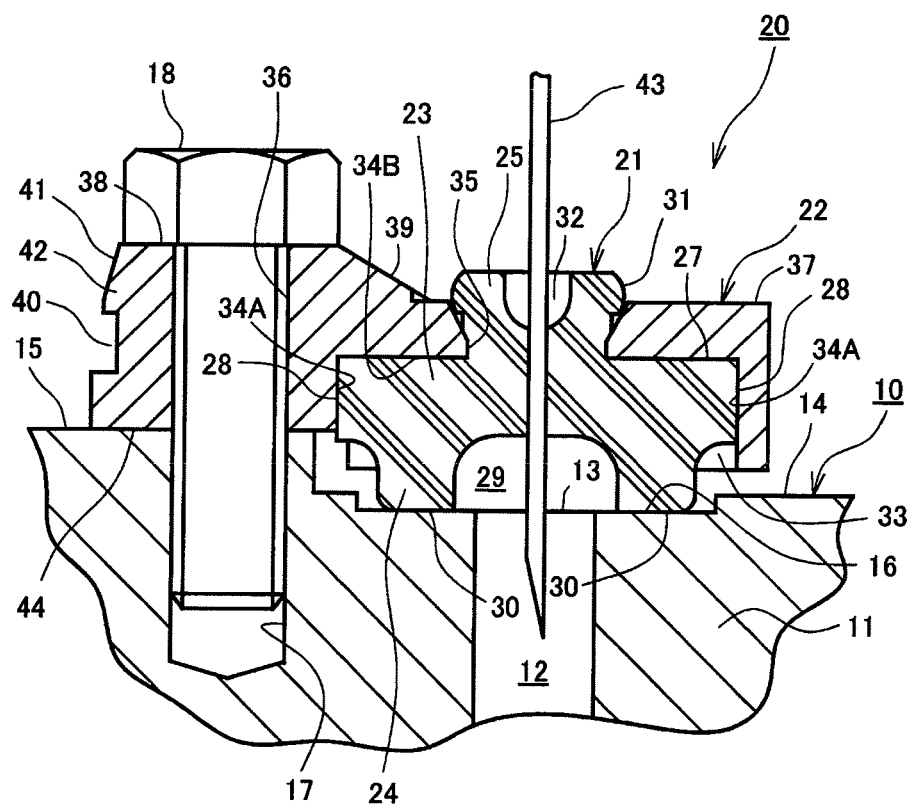
FIG. 4 is a vertical sectional view of the port closing device of FIG. 1, showing a state wherein gas is being injected into the compressor.

After the seal cap 20 is fixed on the compressor 10, the compressor 10 is injected with a test gas for testing the gas tightness of the compressor 10. For this purpose, a needle 43 is pierced through the packing 21 from the second recess 32 into the refrigerant gas passage 12, as shown in FIG. 4. Since the size of the second recess 32 is smaller than that of the port 13 formed coaxially with the second recess 32, there is little fear that the needle 43 pierced through the packing 21 from the second recess 32 may come in contact with the housing 11. With the needle 43 pierced through the packing 21, the test gas is injected into the refrigerant gas passage 12 through the needle 43. After the gas injection is completed, the needle 43 is pulled out from the packing 21.

In the seal cap 20 wherein the packing 21 is pressed against the holding portion 34A of the cap 22 and receives radial compressive force from the cap 22, the needle mark in the packing 21 is closed by the elasticity of the packing 21. Thus, after the needle 43 is pulled out from the packing 21, no test gas leaks from the compressor 10 through the needle mark.

The compressor 10 injected with test gas is placed in a vacuum vessel (not shown) for inspection for any gas leakage from the compressor 10. If sealing between the flat seal portion 30 of the packing 21 and the annular flat surface 16 of the housing 11 is appropriate, no gas leakage occurs. On the contrary, failure to seal due to poor machining of the annular flat surface 16 causes gas leakage.

The seal cap 20 of the first embodiment has the following advantageous effects.

(1) The port 13 of the refrigerant gas passage 12 is closed by the flat seal portion 30 of the packing 21 pressed against the annular flat surface 16 surrounding the port 13. The cap 22 fixed on the housing 11 is pressed against the circumferential surface 28 of the packing 21 for holding the packing 21. Since the packing 21 is pressed against the holding portion 34A of the cap 22 and receives radial compressive force from the cap 22, the needle mark formed by the needle 43 is closed when the needle 43 pierced through the packing 21 is pulled out from the packing 21. Therefore, the gas tightness test of the compressor 10 with the refrigerant gas passage 12 closed by using the packing 21 having the needle mark is conducted.

(2) In the seal cap 20 of the present embodiment wherein the packing 21 is exposed to the outside through the hole 35 of the cap 22, the needle 43 may be pierced through the cap 22 with the port 13 of the housing 11 kept closed.

(3) In removing the cap 22 and the packing 21 from the compressor 10, the grip portion 42 may be used to facilitate the removal. In the seal cap 20 that closes the refrigerant gas passage 12 with the flat seal portion 30 in contact with the annular flat surface 16 surrounding the port 13, the seal cap 20 may be removed from the housing 11 easily as compared, for example, to a seal cap that closes the refrigerant gas passage with a sealing member press-fitted into the refrigerant gas passage.

(4) The packing 21 may be mounted in the cap 22 easily by inserting the second projection 25 through the hole 35. The second projection 25 inserted through the hole 35 and engaged with the pressing portion 34B of the cap 22 prevents the packing 21 from being removed from the cap 22. The main body 23 having an outside diameter that is larger than the inside diameter of the recess 33 is compressed radially inward by elastic deformation, so that the circumferential surface 28 of the main body 23 and the holding portion 34A of the cap 22 are pressed against each other. Therefore, the packing 21 may be held firmly to the cap 22 by the engagement of the second projection 25 of the packing 21 with the pressing portion 34B of the cap 22 and the pressing engagement of the circumferential surface 28 of the main body 23 against the holding portion 34A of the cap 22.

(5) With the second projection 25 inserted through the hole 35, the packing 21 mounted in the cap 22 may be visually confirmed.
(6) Since the second recess 32 is formed smaller than the port 13 as viewed axially of the packing 21, there is little fear that the needle 43 pierced through the packing 21 from the second recess 32 may come in contact with the housing 11. Therefore, damage of the needle 43 and/or the ingress of any foreign matter into the refrigerant gas passage 12 caused by the contact of the needle 43 with the housing 11 are prevented.
(7) The cap 22 covers the peripheries of the packing 21 and the threaded hole 17. The region of contact between the cap 22 and the second surface 15 of the housing 11 provides the region of contact where flanged end of a refrigerant pipe is fixed to the second surface 15 of the housing 11 after the seal cap 20 is removed. Therefore, the cap 22 protects the second surface 15 of the housing 11 to which the flanged end of the refrigerant pipe is fixed.

Figure 5:
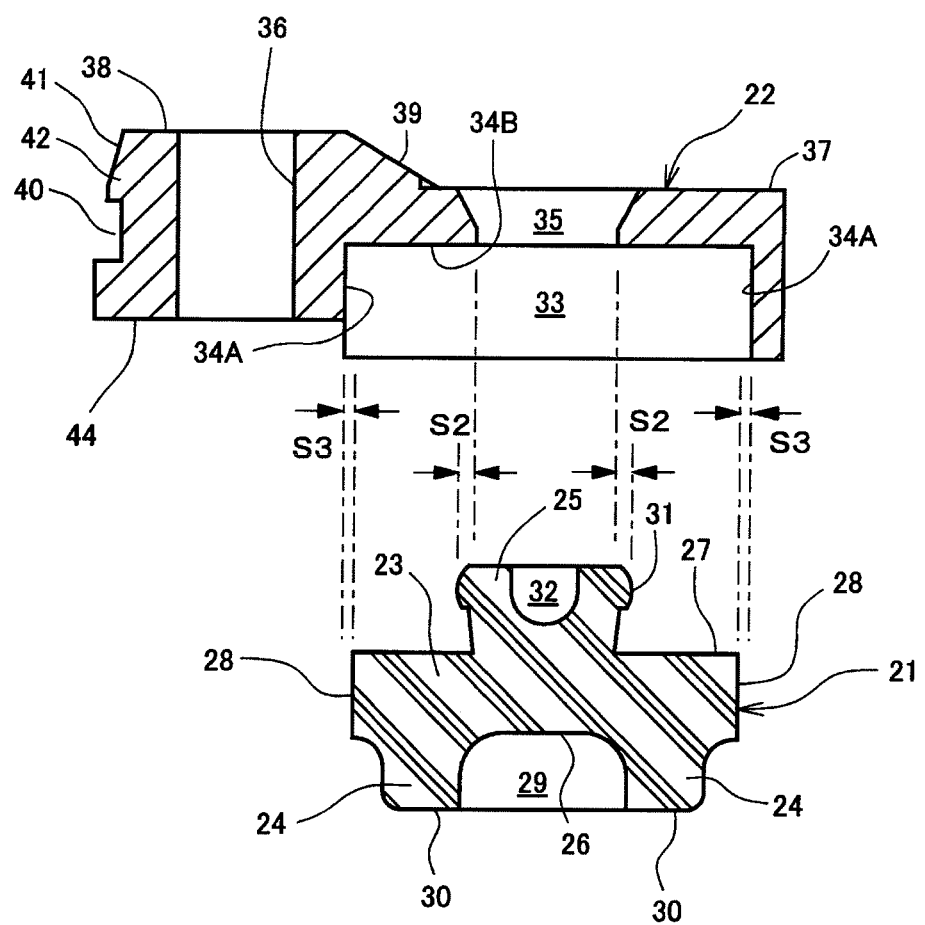
FIG. 5 is an exploded vertical sectional view showing a port closing device for a compressor according to a modification of the first embodiment.

The following will describe a modification of the first embodiment. In this modification, a port closing device with a packing shown in FIG. 5 is used. The port closing device of the present modification which is provided by a seal cap for a compressor of a car air-conditioner differs from that of the first embodiment only in the structure of the packing. The description of the first embodiment other than the packing is incorporated by reference in the description of the present modification. In the description of the present modification, like reference numerals designate like parts or elements used in the description of the first embodiment.

As shown in FIG. 5, dimensional difference S3 is set between the inside diameter of the holding portion 34A and the outside diameter of the main body 23. According to the modification, the inside diameter of the holding portion 34A is larger than the outside diameter of the main body 23 of the packing 21, so that the cap 22 and the packing 21 have a space between the holding portion 34A of the cap 22 and the circumferential surface 28 of the packing 21 when the packing 21 is just mounted in the cap 22 without fixing the cap 22 to the housing 11. Thus, with the packing 21 just mounted in the cap 22, the packing 21 is not pressed against the holding portion 34A of the cap 22.

When the cap 22 is fastened to the housing 11 by the bolt 18, the pressing portion 34B presses the packing 21 toward the port 13. In such a state of the seal cap, the packing 21 is expanded in the direction that is perpendicular to the direction in which the packing 21 is pressed. Therefore, the circumferential surface 28 is pressed against the holding portion 34A.

In addition to the advantageous effects of the first embodiment which have been described earlier under (1) to (7), this embodiment is advantageous in that the mounting of the packing 21 in the cap 22 is accomplished with ease.

The following will describe the port closing device according to the second embodiment of the present invention. The port closing device of the present second embodiment which is provided by a seal cap for a compressor of a car air-conditioner differs from that of the first embodiment only in the structure of the packing. The description of the first embodiment other than the packing is incorporated by reference in the description of the second embodiment. In the description of the present embodiment, like reference numerals designate like parts or elements used in the description of the first embodiment.

Figure 6:
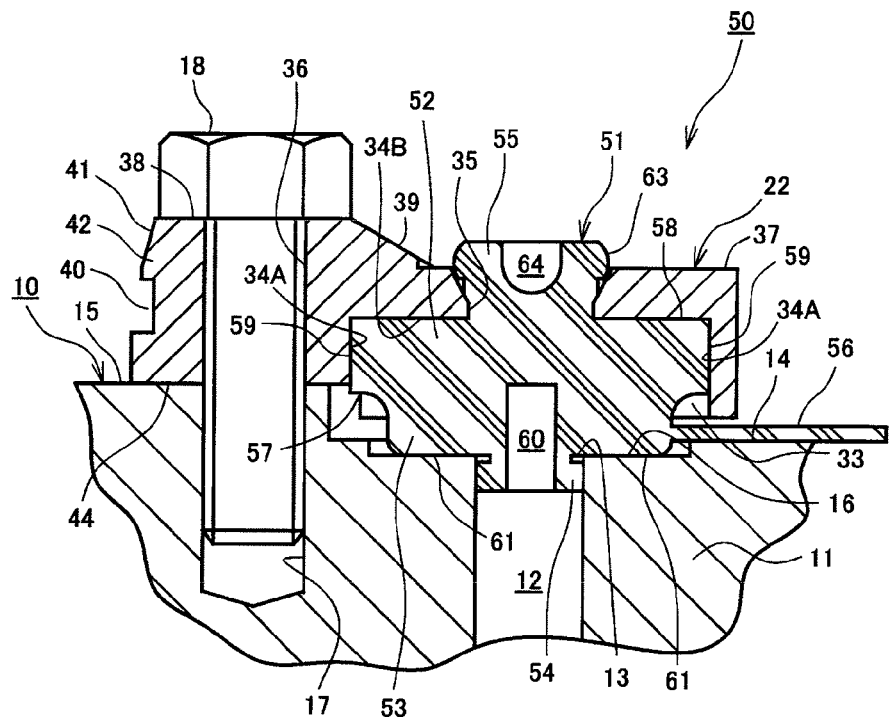
FIG. 6 is a vertical sectional view showing a port closing device for a compressor according to a second embodiment of the present invention.

Referring to FIG. 6 showing the port closing device for the compressor in a vertical sectional view, the packing 51 of the seal cap 50 is made of an elastic rubber that is deformable by application of any external force. The packing 51 has a cylindrical main body 52, an annular first projection 53, an extension 54, a second projection 55 and a plate-like grip portion 56. The first projection 53 extends downward from the lower surface 57 of the main body 52, and the second projection 55 extends upward from the upper surface 58 of the main body 52. The second projection serves as the projection of the present invention. The grip portion 56 extends laterally outward from the outer periphery of the first projection 53. The main body 52 has a circumferential surface 59 formed between the lower surface 57 and the upper surface 58. In the present embodiment, the distal end of the first projection 53 serves as the first end of the packing of the present invention, and the upper surface 58 of the main body 52 serves as the second end of the packing of the present invention. In addition, the circumferential surface 59 serves as the peripheral surface of the present invention. That is, the peripheral surface is formed between the first end and the second end. The packing 51 is held at the circumferential surface 59 thereof by the cap 22.

The packing 51 has in the bottom thereof a first recess 60 surrounded by the main body 52, the first projection 53 and the extension 54. The distal end of the first projection 53 forms a flat seal portion 61. The extension 54 is in the shape of a rod extending from the distal end of the first projection 53. With the seal cap 50 set on the compressor 10, the extension 54 is fitted in the refrigerant gas passage 12 and serves to prevent the seal cap 50 from being rotated with the bolt 18 being turned for fastening the cap 22.

Figure 7:
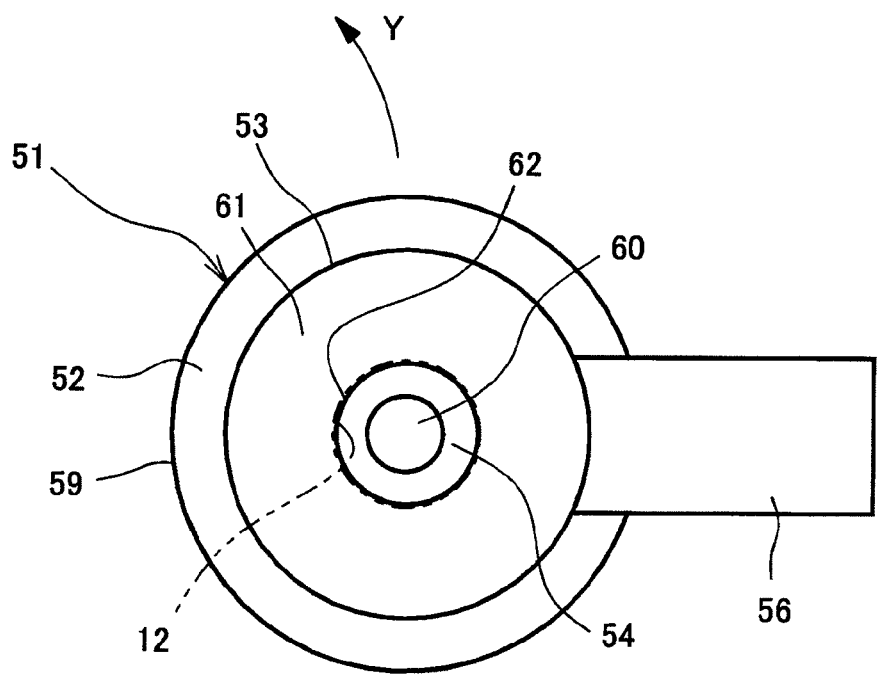
FIG. 7 is a bottom view showing a packing of the port closing device as viewed from refrigerant gas passage of the compressor of FIG. 6.

FIG. 7 shows the packing 51 in a bottom view as viewed from the refrigerant gas passage 12 of the compressor 10 which is indicated by the chain double-dashed line. As shown in FIG. 7, the extension 54 has a surface 62 which is formed to be contactable with the inner wall of the refrigerant gas passage 12 without closing the passage 12 completely. The arrow Y in FIG. 7 indicates the direction in which the bolt 18 is turned for fastening. The seal cap 50 which tends to be rotated with the bolt 18 turned in the arrow direction Y for fastening the cap 22 is prevented from making such rotation because the surface 62 of the extension 54 is in contact with the inner wall of the refrigerant gas passage 12 over substantially the entire circumference. It is noted that with the extension 54 fitted in the refrigerant gas passage 12, there exists a slight space between the surface 62 and the inner wall of the refrigerant gas passage 12 so that the extension 54 does not seal the refrigerant gas passage 12.

The grip portion 56 extends laterally from the first projection 53 beyond the outer periphery of the cap 22. The grip portion 56 is held by hand in removing the packing 51, thereby facilitating the removal of the packing 51 from the housing 11. For example, even if only the packing 51 is not removed from the housing 11 with the extension 54 fitted in the refrigerant gas passage 12 in removing the seal cap 50 from the compressor 10, the grip portion 56 facilitates the removal of the packing 51 from the housing 11. The grip portion 56 should have a thickness providing a strength that is great enough to resist the grip operation.

The second projection 55 is substantially the same as the second projection 25 of the first embodiment. The second projection 55 has a maximum-diameter portion 63 and a second recess 64.

The seal cap 50 of the present second embodiment offers substantially the same advantageous effects as those of the first embodiment which have been described under (1) to (7). In addition, the seal cap 50 is prevented from being rotated with the bolt 18 in turning the bolt 18 to fasten the cap 22.

Furthermore, the grip portion 56, which extends out of the cap 22, helps to remove the packing 51 from the compressor 10 positively.

Figure 8A:
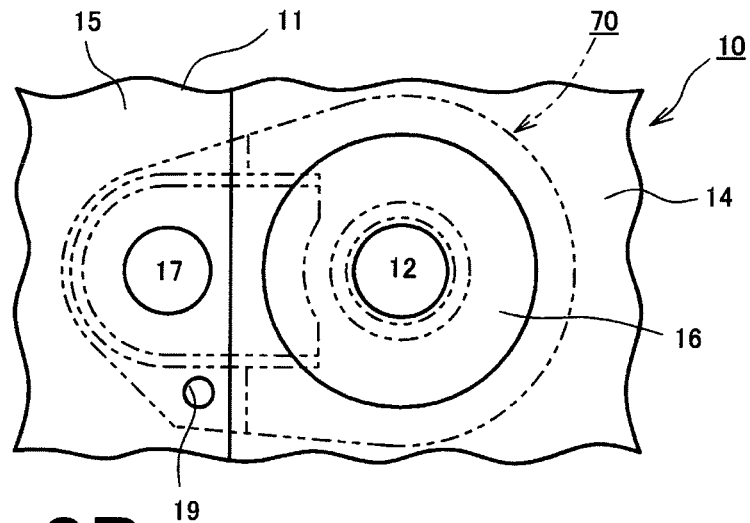
FIG. 8A is a fragmentary plan view showing a housing of the compressor having a port closing device according to a third embodiment of the present invention.
Figure 8B:
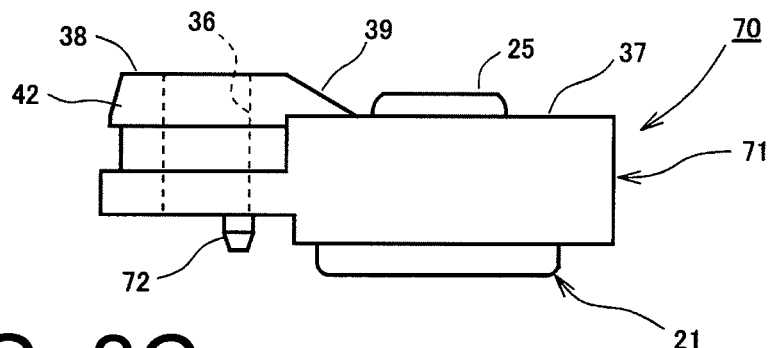
FIG. 8B is a side view showing the port closing device of FIG. 8A.
Figure 8C:
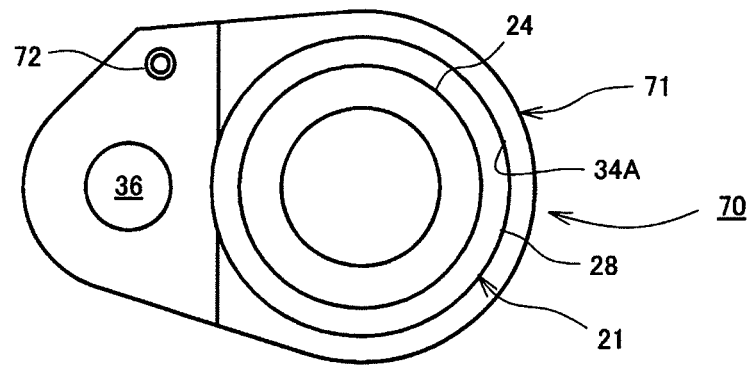
FIG. 8C is a bottom view showing the port closing device of FIG. 8A.

The following will describe the port closing device according to the third embodiment of the present invention with reference to FIGS. 8A to 8C. The port closing device of the present embodiment is also provided by a seal cap for a compressor of a car air-conditioner. The third embodiment differs from the first embodiment only in the structure of the cap and the basic structure of the cap of the present third embodiment is substantially the same as that of the first embodiment. Therefore, the holding portion 34A, the insertion hole 36, the first cap surface 37, the second cap surface 38, the third cap surface 39 and the grip portion 42 of the cap 71 are designated by the same reference numerals used in the description of the first embodiment.

Referring to FIG. 8A showing in a fragmentary plan view the housing 11 of the compressor 10 having the port closing device according to the third embodiment of the present invention, the housing 11 has a threaded hole 17 and a hole 19 that is spaced away from the threaded hole 17. Referring to FIGS. 8B and 8C showing the port closing device of the third embodiment, the cap 71 has on the surface thereof that is in contact with the second surface 15 a pin 72 that may be fitted in the hole 19. The pin 72 serves as an anti-rotation pin for preventing the seal cap 70 from being rotated with the bolt 18 turned in fastening the seal cap 70 to the compressor 10 by turning the bolt 18. With the seal cap 70 fixed on the compressor 10, the pin 72 is fitted in the hole 19.

The seal cap 70 of the present embodiment offers substantially the same advantageous effects as those of the first embodiment which have been described under (1) to (7). In addition, the seal cap 70 is prevented from being rotated with the bolt 18 in fastening the seal cap 70 to the compressor 10 by turning the bolt 18.

The present invention has been described in the context of the first through third embodiments (including the modification of the first embodiment), but it is not limited to these embodiments. It is obvious to those skilled in the art that the invention may be practiced in various manners as exemplified below.

Although in the above-described embodiments the port closing device is used for closing the suction port of the refrigerant gas passage of a compressor, it may be used for closing the discharge port of the refrigerant gas passage of the compressor.

Although in the above-described embodiments the main body of the packing and the recess in the cap are formed circular in cross section, the cross sectional shape of the main body of the packing and the recess in the cap is not limited to a circle. The shape may be an ellipse, obround, polygon or any indeterminate form. The peripheral surface of the packing and the holding portion of the cap need not be pressed against each other over the entire peripheries thereof. For example, the peripheral surface of the packing and the holding portion of the cap may be formed so that the packing is held at three points by the cap.

Although in the above-described embodiments the second projection of the packing is inserted through the hole in the cap, the packing may dispense with the second projection. In this case, the upper surface of the packing mounted in the cap is exposed to the outside.

Although the packing of the first embodiment is used in the third embodiment, the packing of the second embodiment may be used instead of the packing of the first embodiment.

In the second embodiment, the surface 62 of the extension 54 is in contact with the inner wall of the refrigerant gas passage 12 over substantially the entire periphery to such an extent that the surface 62 does not affect the closure of the suction port 13. However, the surface 62 may be in partial contact with the inner wall of the refrigerant gas passage 12 as far as the rotation of the seal cap 50 with the bolt 18 is prevented.

Although in the above-described embodiments the bolt 18 has a head and a threaded portion, any other suitable fastening member may be used such as the combination of a stud bolt and a nut.

What is claimed is:

1. A port closing device for a compressor, wherein the port closing device is fixed to a housing of the compressor by a bolt, comprising:
    a packing for closing a suction port or a discharge port formed in the housing, the packing having a first end, a second end and a peripheral surface formed between the first end and the second end, the first end of the packing having a flat seal portion that is in contact with a surface of the housing surrounding the port, the packing having an extension that is fitted in the port; and
    a cap having a holding portion that presses the peripheral surface of the packing for holding the packing, and a pressing portion that presses the second end of the packing, the pressing portion of the cap having therethrough a hole.

2. The port closing device according to claim 1, wherein the packing has a projection that extends from the second end through the hole.

3. The port closing device according to claim 1, wherein the packing and the cap are configured such that a space is formed between the peripheral surface of the packing and the holding portion of the cap when the packing is mounted in the cap without fixing the cap to the housing.

4. The port closing device according to claim 1, wherein the packing has a grip portion that extends outward from the peripheral surface for removing the extension.

* * * * *